(12) United States Patent
Cortese

(10) Patent No.: US 6,584,888 B2
(45) Date of Patent: Jul. 1, 2003

(54) COFFEE MACHINE

(75) Inventor: Virginio Cortese, Turin (IT)

(73) Assignee: SGL Italia S.R.L., Turin (IT)

( * ) Notice: Subject to any disclaimer, the term of this patent is extended or adjusted under 35 U.S.C. 154(b) by 0 days.

(21) Appl. No.: 10/026,659

(22) Filed: Dec. 27, 2001

(65) Prior Publication Data

US 2002/0088348 A1 Jul. 11, 2002

(30) Foreign Application Priority Data

Dec. 29, 2000 (IT) .......................... TO20A1226
Feb. 12, 2001 (IT) .......................... TO21A0115

(51) Int. Cl.[7] ................................. A47J 31/40
(52) U.S. Cl. ................. 99/289 R; 99/295; 99/302 P
(58) Field of Search ................. 99/302 P, 295, 99/289 R, 302 R, 289 D, 289 P, 279

(56) References Cited

U.S. PATENT DOCUMENTS 5,964,142 A * 10/1999 Tio .......................... 99/289 R
6,035,762 A * 3/2000 Ruckstuhl ................... 99/295

FOREIGN PATENT DOCUMENTS

FR       2788955       4/2000
WO       WO 00/51479   8/2000

* cited by examiner

Primary Examiner—Reginald L. Alexander

(57) ABSTRACT

A coffee machine wherein a pressurized-hot-water sprinkler is aligned, along a horizontal first axis, with a hydraulic cylinder, a piston of which supports a dispenser cup for housing a ground-coffee container, and is movable along the first axis to move the dispenser cup to and from an infusion position in which the dispenser cup is connected to the sprinkler; and wherein the dispenser cup is connected to the piston to oscillate, with respect to the piston and about a horizontal second axis, between a load setting in which the dispenser cup is tilted upwards towards a vertical loading conduit, and an unload setting in which the dispenser cup is tilted downwards.

25 Claims, 6 Drawing Sheets

COFFEE MACHINE

The present invention relates to a coffee machine.

More specifically, the present invention relates to a coffee machine of the type comprising a horizontal dispenser assembly, in turn comprising a boiler with a pressurized-hot-water sprinkler; a dispenser cup for housing at least part of a ground-coffee container and positioned facing the sprinkler; a hydraulic thrust cylinder aligned with the boiler along a horizontal axis, located on the opposite side of the dispenser cup to the boiler, and comprising a piston for moving the dispenser cup to and from an infusion position in which the dispenser cup is connected to the sprinkler; and a vertical loading conduit for loading a ground-coffee container between the sprinkler and the dispenser cup.

BACKGROUND OF THE INVENTION

In a known coffee machine of the above type, the dispenser cup is fixed with respect to the hydraulic cylinder piston, is aligned with the boiler sprinkler and the hydraulic cylinder along said horizontal axis, and is movable by the piston between said infusion position and a withdrawn rest or loading position in which the dispenser cup defines, with the sprinkler, a passage located directly beneath the loading conduit and for receiving a ground-coffee container positioned on edge and coaxial with said horizontal axis.

In actual use, a ground-coffee container is fed on edge along the loading conduit into said passage where it is arrested by a shutter plate, which arrests the fall of the container and keeps it in said position aligned with the dispenser cup and the boiler sprinkler. The hydraulic cylinder is then activated to move the dispenser cup into the infusion position in which the dispenser cup normally houses at least part of the container and presses it in fluidtight manner against the sprinkler. Once the coffee is percolated, the dispenser cup is restored to the rest position and the shutter plate is removed to allow the used container to drop through the passage.

The known machine described above has several drawbacks, the worst of which all depend, directly or indirectly, on the presence of the shutter plate. That is, owing to the presence of the shutter plate, the known machine described above, as opposed to using any type of ground-coffee container, be it a wafer or rigid capsule, can only operate using special containers having a rigid, perfectly cylindrical lateral wall capable of ensuring, in contact with the shutter plate, that the container is perfectly coaxial with the sprinkler and dispenser cup. Moreover, the shutter plate must be capable of performing movements independent of those imparted to the dispenser cup by the hydraulic cylinder, and must therefore have an independent actuating device normally comprising an electric motor featuring a given number of control microswitches and in itself bulky and expensive.

SUMMARY OF THE INVENTION

It is an object of the present invention to provide a coffee machine which is cheap and easy to produce and at the same time provides for eliminating the aforementioned drawbacks.

According to the present invention, there is provided a coffee machine of the type comprising a horizontal dispenser assembly, in turn comprising a boiler with a pressurized-hot-water sprinkler; a dispenser cup for housing at least part of a ground-coffee container, the dispenser cup being positioned facing said sprinkler; a hydraulic thrust cylinder aligned with the boiler along a horizontal first axis and located on the opposite side of said dispenser cup to the boiler, the hydraulic cylinder comprising a piston for moving the dispenser cup to and from an infusion position in which the dispenser cup is connected to said sprinkler; and a vertical loading conduit for loading a said container between said sprinkler and said dispenser cup; the machine being characterized in that said dispenser cup is supported by said piston to oscillate—with respect to the piston, preferably by virtue of a thrust imparted by the piston, and about a second axis, preferably a horizontal axis, crosswise to said first axis—between a load setting in which the dispenser cup faces at least partly upwards and towards said loading conduit, and an unload setting in which the dispenser cup is oriented at least partly downwards, and via an infusion setting assumed by the dispenser cup in said infusion position, and in which the dispenser cup is coaxial with said first axis.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
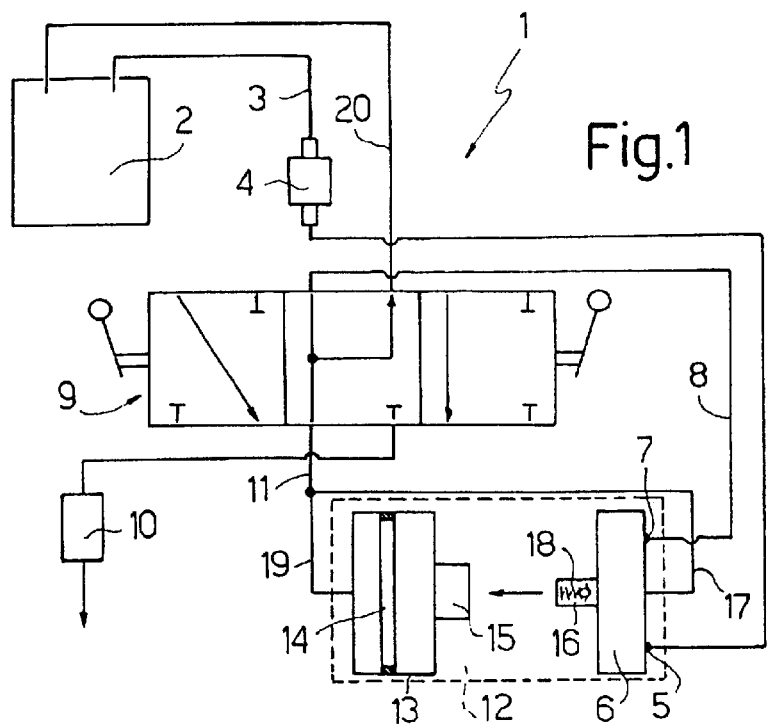
FIG. 1 shows a schematic block diagram of a preferred embodiment of the coffee machine according to the present invention.

Number 1 in FIG. 1 indicates as a whole a coffee machine comprising a cold-water tank 2, an outlet conduit 3 of which is fitted with an electromagnetic pump 4. Conduit 3 connects tank 2 to an inlet 5 of a boiler 6, an outlet 7 of which supplies pressurized hot water along a conduit 8 to an inlet of a slide valve 9.

Valve 9, when moved rightwards in FIG. 1, connects conduit 8 to a hot-water nozzle 10, and, when moved leftwards in FIG. 1, connects conduit 8 to a conduit 11 for supplying pressurized hot water to a coffee dispenser assembly 12, which comprises boiler 6, and a hydraulic cylinder 13 coaxial with and facing boiler 6 and in turn comprising a piston 14 movable to and from boiler 6 to move a coffee dispenser cup 15 to and from a position engaging a sprinkler 16 projecting axially from boiler 6 and for dispensing pressurized hot water. More specifically, by means of a conduit 17 through boiler 6, conduit 11 communicates directly with sprinkler 16, which is controlled by a valve 18 which only opens when the pressure inside conduit 11 reaches a given value. Conduit 11 also communicates directly with a conduit 19 for supplying pressurized water to hydraulic cylinder 13.

When set to the middle position shown in FIG. 1, valve 9 connects both pump 4 and conduit 11 to a conduit 20 for feeding water back to tank 2.

In actual use, when valve 9 is moved left- or rightwards from the middle position shown in FIG. 1, pump 4 is activated so that cold water is fed to inlet 5 of boiler 6, and pressurized hot water is fed along conduit 8 to the inlet of valve 9.

When valve 9 is moved rightwards, pressurized hot water is fed directly to nozzle 10; and, when valve 9 is moved leftwards, pressurized hot water is fed along conduit 11 to both conduits 17 and 19. The pressurized hot water is prevented temporarily by valve 18 from issuing from sprinkler 16, while the pressurized hot water fed to hydraulic cylinder 13 moves piston 14 and dispenser cup 15 towards sprinkler 16. Upon dispenser cup 15 contacting sprinkler 16 in fluidtight manner, piston 14 is arrested and the pressure inside conduits 17 and 19 is simultaneously increased, thus opening valve 18 to percolate the coffee.

Figure 6:
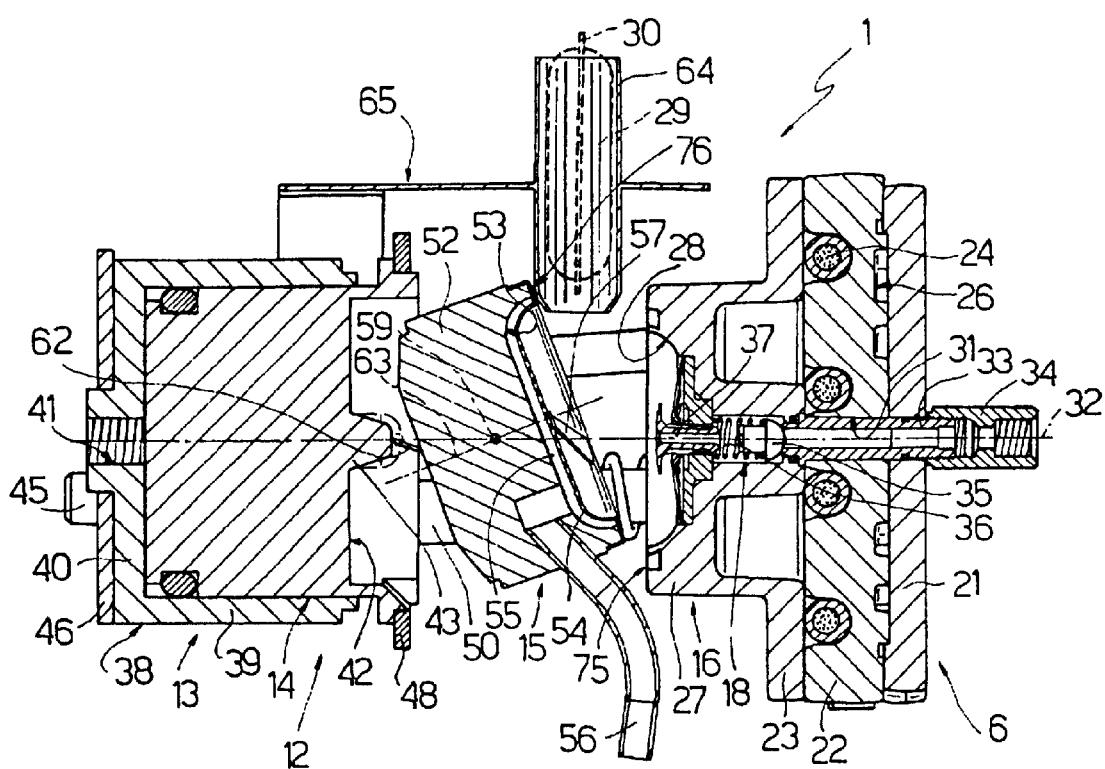
FIG. 6 shows an axial section of FIG. 3.

As shown in FIG. 6, boiler 6 in dispenser assembly 12 is defined by three superimposed plates 21, 22 and 23, the intermediate plate 22 of which is embedded with an electric resistor 24 having two outer terminals 25 (FIG. 2), and comprises, on the surface facing the outer plate 21, a groove closed in fluidtight manner by plate 21 and defining a coil 26 connecting inlet 5 to outlet 7. A cylindrical body 27, defining sprinkler 16, projects axially from the surface of plate 23 facing cylinder 13, and comprises, on its own end surface facing cylinder 13, a cavity 28 for housing a respective half of a ground-coffee wafer 29, the outer casing of which is defined, as shown in FIG. 6, by two paper half-wafers integral with each other along an equatorial flange 30.

An axial hole 31 is formed through plates 21, 22, 23 and cylindrical body 27, and is fitted inside, coaxially with a horizontal axis 32 of boiler 6, with a conduit 33, one end of which projects outwards of plate 21 with a fitting 34 for connecting conduit 33 and conduit 17, and the other end of which, facing hydraulic cylinder 13, is controlled by valve 18, which comprises a shutter 35 pushed towards conduit 33 by a spring 36. The end of hole 31 coming out inside the bottom of cavity 28 is engaged in sliding manner by a tubular, goblet-shaped extractor 37, which is maintained by spring 36 in a normally extracted position inside cavity 28.

Still with reference to FIG. 6, hydraulic cylinder 13 comprises a cup-shaped body 38 having a substantially cylindrical lateral wall 39 coaxial with axis 32 and closed, at the opposite end to that facing boiler 6, by an end wall 40 having an axial through hole 41 for connection to conduit 19. Lateral wall 39 is engaged in axially-sliding and fluidtight manner by piston 14, which is substantially cylindrical and comprises, on the side facing boiler 6, a cavity 42 having a central truncated-cone-shaped projection 43 coaxial with axis 32.

Figure 2:
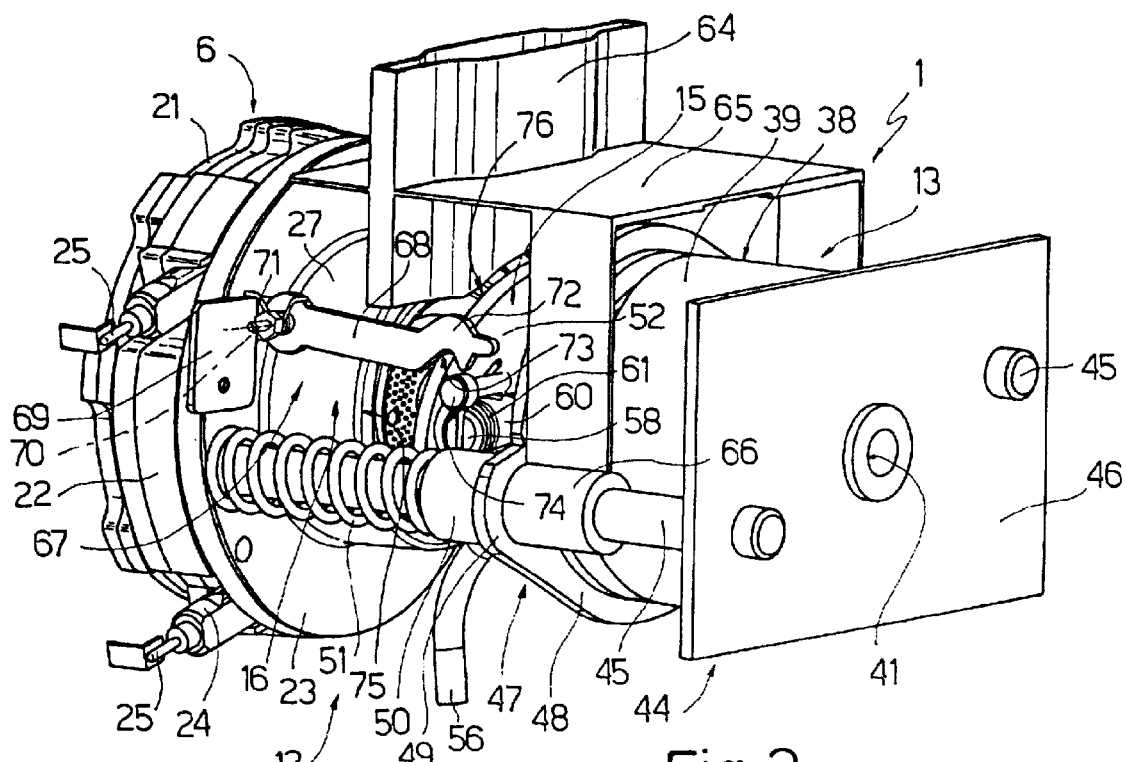
FIG. 2 shows a larger-scale view in perspective of a detail in FIG. 1.

As shown more clearly in FIG. 2, boiler 6 and cup-shaped body 38 are made integral with each other by an outer bracket 44 comprising two cylindrical rods 45 lying on a substantially horizontal plane on opposite sides of boiler 6 and hydraulic cylinder 13, and extending parallel to axis 32 outside lateral wall 39. Bracket 44 also comprises a plate 46 resting on the outer surface of end wall 40 and integral with one end of each of rods 45, the other end of each of which is integral with plate 23.

Rods 45 form part of a device 47 for axially guiding and angularly locking piston 14 with respect to cup-shaped body 38. Device 47 comprises a ring nut 48, which is fixed, outside lateral wall 39, to the end of piston 14 facing boiler 6, and projects radially outwards with respect to lateral wall 39 with two lugs 49 supporting two bushes 50, each of which is engaged in sliding manner by a respective rod 45, and is slid by piston 14 along respective rod 45 towards boiler 6 and in opposition to a respective return spring 51 coaxial with respective rod 45 and compressed between respective bush 50 and plate 23.

As shown more clearly in FIG. 6, dispenser cup 15 comprises a substantially cylindrical body 52 interposed between piston 14 and sprinkler 16 of boiler 6, and having, on the side facing sprinkler 16, a cavity 53 partly engaged by a perforated cup 54, the shape of which is a specular image of cavity 28. Cup 54 is designed to receive a respective half of a wafer 29, and defines, inside cavity 53, a chamber 55 separated from the outside by cup 54 and communicating with a coffee spout 56. A leaf-spring extractor 57 is anchored to the surface of cup 54 facing boiler 6.

As shown more clearly in FIG. 2, body 52 is fitted with two diametrically-opposite outer pins 58 projecting outwards from body 52 and coaxial with each other and with a substantially horizontal axis 59 perpendicular to axis 32. The two pins 58 are connected in rotary manner to respective arms of a fork 60 integral with the end of piston 14 facing boiler 6, so as to allow dispenser cup 15 to oscillate, with respect to piston 14, about axis 59 by means of and in opposition to two coil springs 61 coaxial with respective pins 58 and interposed between body 52 and fork 60.

As shown in FIG. 6, a leaf spring 62 projects from the bottom surface of body 52 facing piston 14, and is normally maintained by springs 61 contacting projection 43 to keep body 52 in a normal receiving or load setting in which an axis 63 of body 52 slopes upwards towards boiler 6, and the inside of cup 54 is accessible from the top by a wafer 29 fed into the gap between body 52 and the free end of cylinder 27 along a vertical drop-down conduit 64 supported, over body 52, by a bracket 65 secured in a fixed position to rods 45 by means of respective bushes 66.

As shown in FIGS. 2 to 5, dispenser assembly 12 comprises a retaining device 67 in turn comprising a rod 68, a first end of which is hinged to a bracket 69, fitted to plate 23 alongside sprinkler 16 and over axis 32, so as to rotate upwards about an axis 70 parallel to axis 59 and in opposition to a spring 71, and a second end of which is shaped in the form of a hook 72 having a downward-facing, concave surface 73 which is engaged by a pin 74 parallel to pins 58 and projecting from body 52 over axis 59. The length of rod 68 is such that the distance between hook 72 and an annular free-end surface 75 of cylindrical body 27 of sprinkler 16 is greater than the distance between pin 74 and an annular free-end surface 76 of body 52 facing boiler 6, and is less than the distance between pin 74 and surface 75 when body 52 is in the normal load setting shown in FIG. 6.

Operation of dispenser assembly 12 will now be described with reference to FIGS. 3 to 6, and as of the instant (FIGS. 3 and 6) in which a wafer 29 is inserted downwards into conduit 64 and dropped on edge towards dispenser cup 15.

When this occurs, piston 14 maintains dispenser cup 15 in a normal withdrawn rest position, in which dispenser cup 15 is maintained by springs 61 in the load setting with leaf spring 62 resting on projection 43, and axis 63 sloping upwards towards boiler 6. With dispenser cup 15 in the above load setting, cup 54 is accessible from the outside to receive and retain the respective half of the wafer 29 dropped from above along conduit 64.

At this point, piston 14 is moved along axis 32 towards boiler 6 so as to also move dispenser cup 15 along axis 32 until a portion of annular surface 76 of body 52 beneath axis 32 comes into contact with a corresponding portion of annular surface 75 of sprinkler 16. When this occurs, the axial thrust of piston 14 and the resistance of sprinkler 16 combine to generate a straightening moment, which rotates dispenser cup 15 about axis 59 into the infusion setting (FIG. 4) wherein axis 63 of dispenser cup 15 coincides with axis 32 of boiler 6, and surfaces 75 and 76 grip flange 30 of wafer 29 in fluidtight manner.

Figure 4:
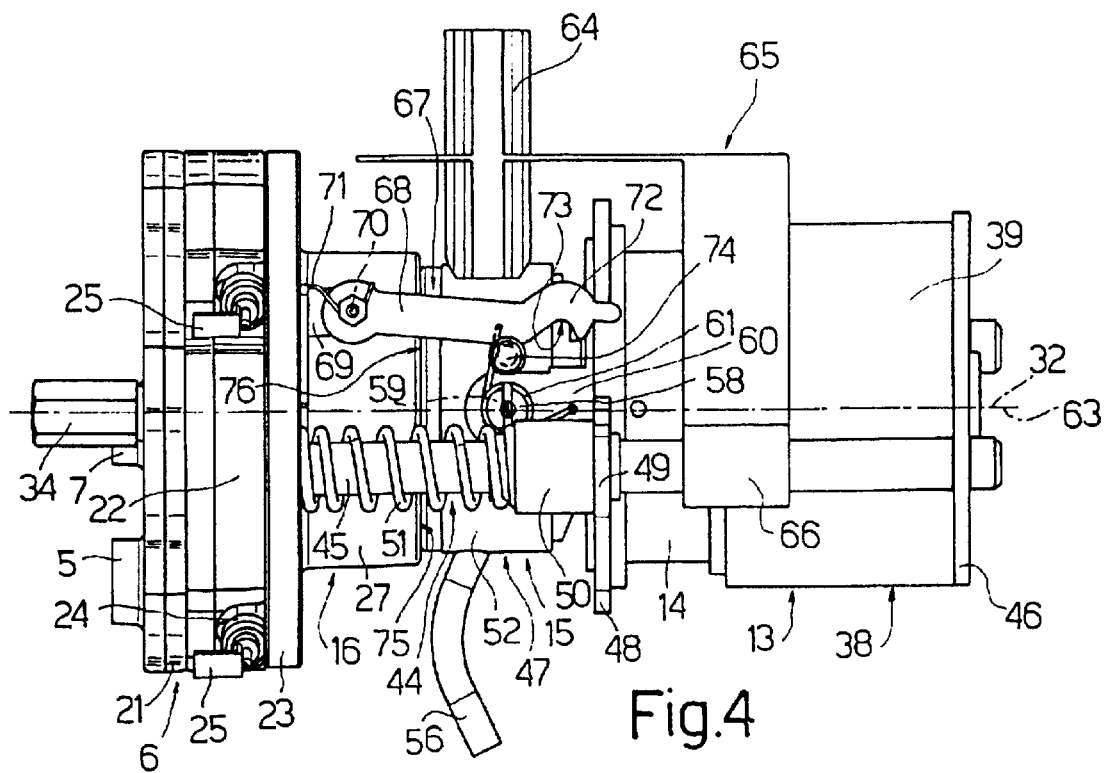
Figure 5:
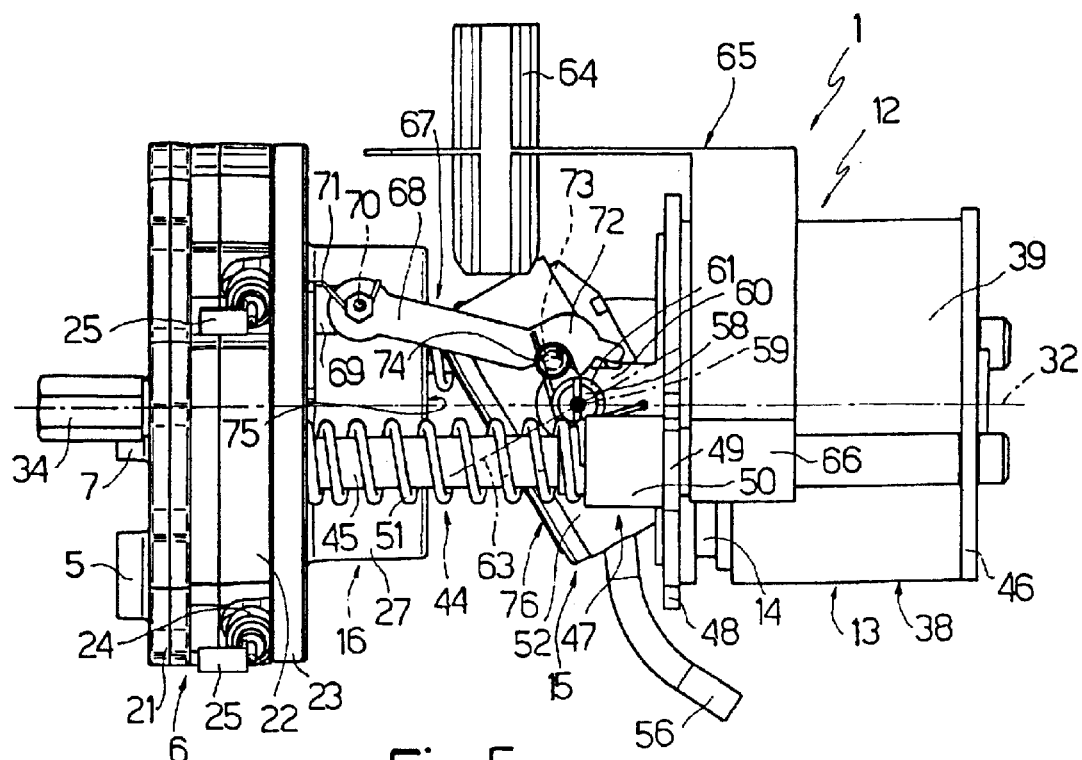

In the course of the above movements, given its length and the downward thrust imparted by spring 71, rod 68 of retaining device 67 is maintained resting on pin 74, and, when dispenser cup 15 reaches the infusion position and setting shown in FIG. 4, is positioned with an intermediate portion resting on pin 74.

Dispenser cup 15 is maintained in the infusion position and setting for a given length of time, during which, pressurized hot water is fed, as already explained, through wafer 29 to produce the coffee which flows out along percolation spout 56.

When the pressurized hot water is cut off and hydraulic cylinder 13 is connected to the feedback conduit 20 to the tank, the pressure in hydraulic cylinder 13 falls to ambient pressure, and piston 14 is pushed back by springs 51 into the withdrawn rest position, taking dispenser cup 15 with it. As it is withdrawn, dispenser cup 15 is detached from sprinkler 16 and axis 63 begins rotating upwards; in the course of which movement, wafer 29 is detached from sprinkler 16 by the thrust imparted by extractor 37, and also from cup 54 by the thrust imparted by extractor 57, but is retained by force of gravity inside cup 54.

The above initial movement causes pin 74 to slide along rod 68 and engage hook 72. Since the concave surface 73 of hook 72 is so shaped as to only engage pin 74 and hook 72 when pin 74 slides along rod 68 in the opposite direction to boiler 6, further withdrawal of piston 14 arrests pin 74 and, by virtue of the thrust exerted by springs 51 combined with hook 72 engaging pin 74, produces a tilting moment which rotates axis 63 downwards and moves dispenser cup 15 gradually into an unload setting (FIG. 5) in which cup 54 faces at least partly downwards to drop the used wafer 29 into a bin not shown.

Figure 3:
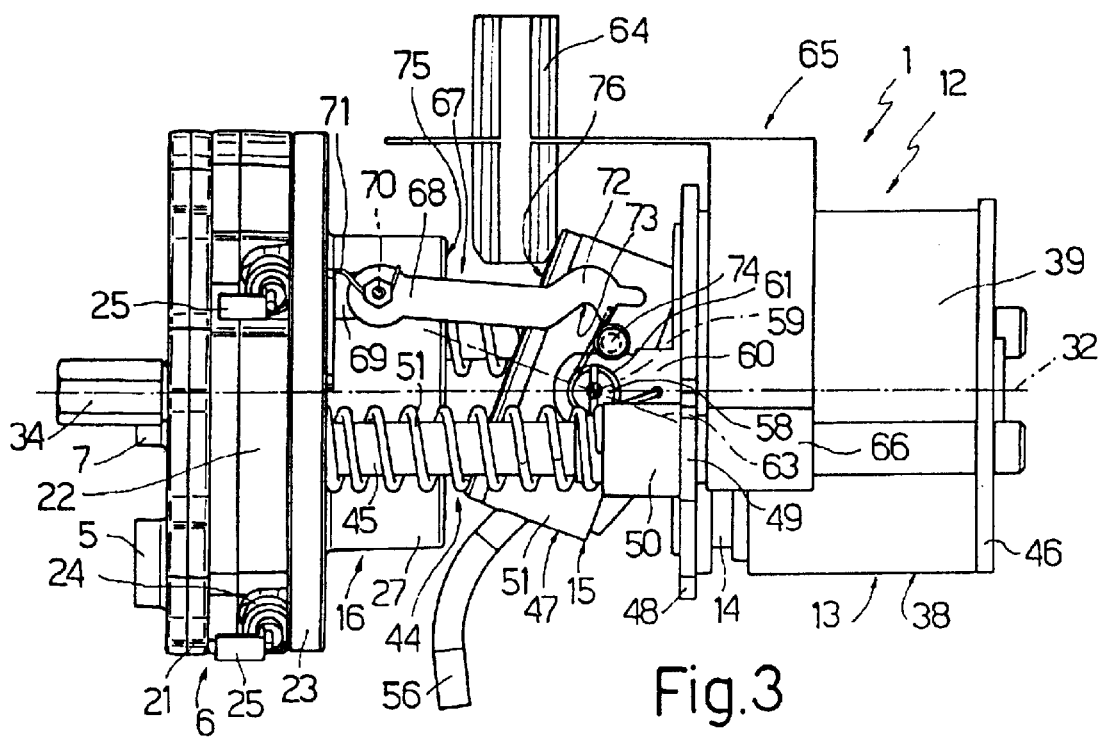
FIGS. 3, 4 and 5 show side views of the FIG. 2 detail in three different operating positions.

As dispenser cup 15 rotates downwards, pin 74 rolls partly along concave surface 73 of hook 72 to eventually release hook 72, so that dispenser cup 15 is restored by springs 61 to the load setting (FIGS. 3 and 6).

As will be clear from the foregoing description, dispenser assembly 12 is highly straightforward and practical, the only active member being hydraulic cylinder 13, and can operate with any type of wafer 29, by having no intermediate intercepting member, so that wafer 29 is fed directly into dispenser cup 15.

As will also be clear from the foregoing description, very few changes need be made to adapt dispenser assembly 12 to any type of currently marketed ground-coffee container.

Figure 7:
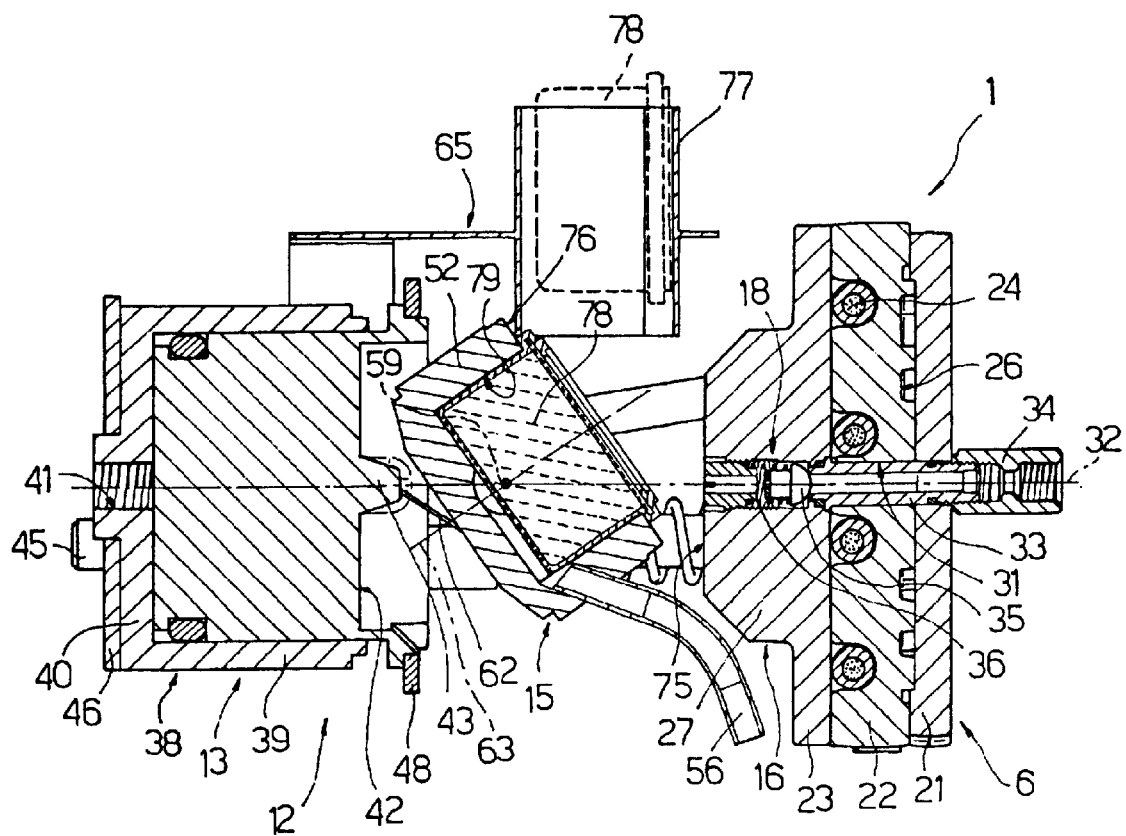
FIG. 7 shows an axial section of a variation of the FIGS. 2–6 detail in the FIG. 3 operating position.

By way of demonstration, FIG. 7 shows a dispenser assembly 12 substantially identical with that in FIGS. 2 to 6, except that wafer conduit 64 is replaced with a conduit 77 for rigid ground-coffee capsules 78, cavity 28 and extractor 37 of sprinkler 16 are dispensed with, surface 75 is a flat surface, and body 52, as opposed to cavity 53 and cup 54 with extractor 57, comprises a cavity 79 for receiving a capsule 78.

Figure 8:
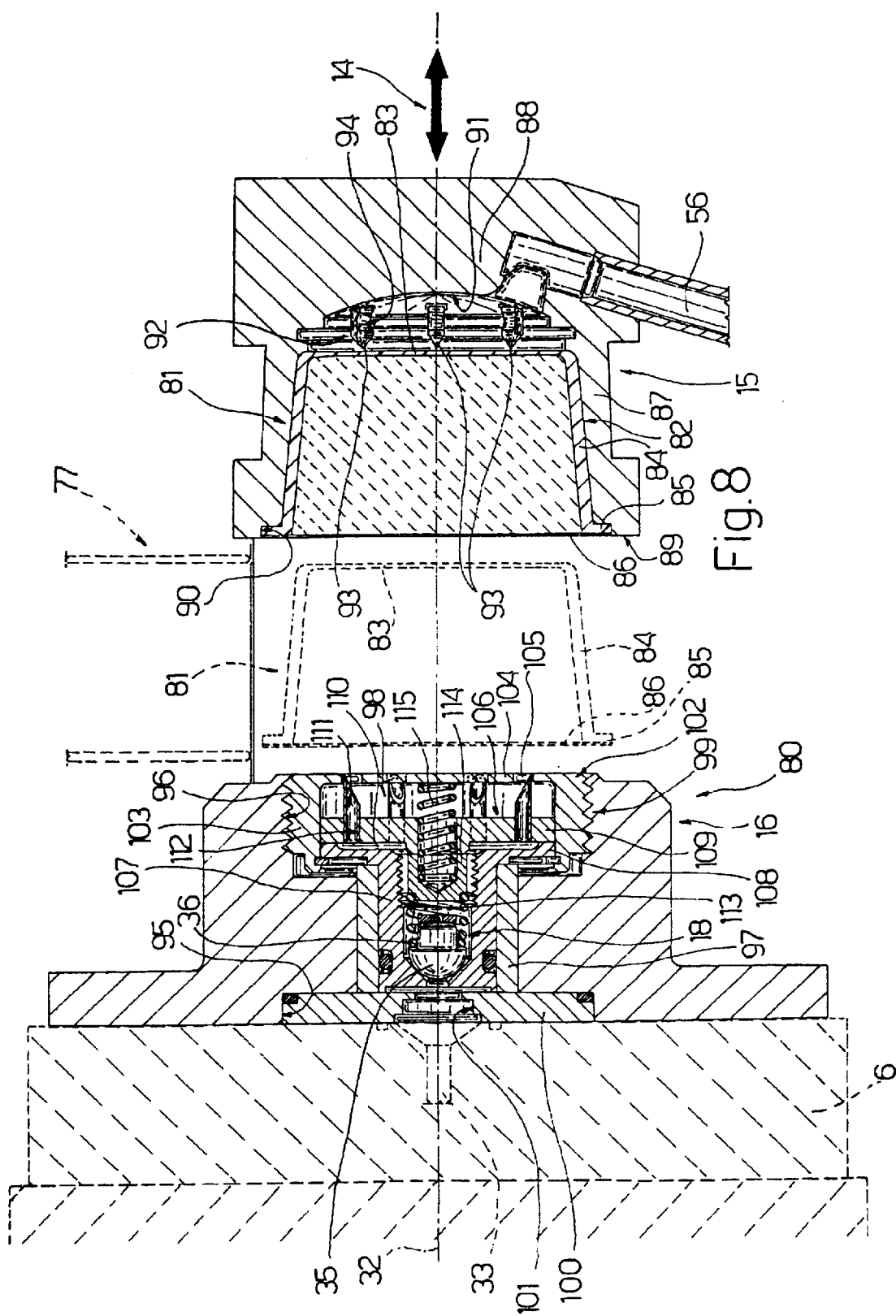
FIG. 8 shows a schematic axial section of a variation of a detail in FIG. 7.

By way of further demonstration, FIG. 8 shows a dispenser assembly 80 similar to dispenser assembly 12 but for receiving a sealed ground-coffee capsule 81.

As shown in FIG. 8, sealed capsule 81, of known type, comprises a cup-shaped body 82 of thermoplastic material containing a measure of ground coffee and having a relatively thin, continuous bottom wall 83, and a continuous, truncated-cone-shaped lateral wall 84 tapering towards bottom wall 83 and having an outer annular flange 85 on the opposite end to that connected to bottom wall 83. Sealed capsule 81 is complete with a sealing film 86 connected in fluidtight manner to flange 85 to seal the respective measure of ground coffee inside cup-shaped body 82.

Dispenser cup 15 is in the form of a cup open on the side facing sprinkler 16, and comprises a truncated-cone-shaped lateral wall 87, which is closed, on the side facing hydraulic cylinder 13, by a concave bottom wall 88 through which spout 56 is formed, and is defined, on the side facing sprinkler 16, by an annular edge 89 surrounding an annular seat 90. Dispenser cup 15 is designed to house a sealed capsule 81 with lateral wall 84 contacting the inner surface of lateral wall 87, and with flange 85 engaged inside annular seat 90.

When sealed capsule 81 is so positioned, respective bottom wall 83 is located a given distance from the concave inner surface of bottom wall 88, and defines, with bottom wall 88, a chamber 91 communicating with spout 56 and housing a known piercing device 92 operating as described later on. Piercing device 92 comprises a number of needles 93, each of which projects axially from the inner surface of bottom wall 88, has a lateral groove 94, and has a pointed end located, in use and at rest, a relatively small distance from the outer surface of bottom wall 83 of capsule 81 inside dispenser cup 15.

Sprinkler 16 comprises, on the side facing boiler 6, a cylindrical cavity 95 coaxial with axis 32 of conduit 33, and, on the side facing dispenser cup 15, a cylindrical, internally threaded cavity 96, which is coaxial with axis 32 and connected to cavity 95 by a through hole smaller in diameter than cavities 95 and 96 and fitted with a tubular, low-friction liner 97.

Cavities 95 and 96 and liner 97 are fitted inside with a piercing device 98 comprising a hydraulic cylinder 99, an outer body of which comprises liner 97, a circular plate 100 fitted in fluidtight manner inside cavity 95 and having a central through hole 101 coaxial with axis 32, and a cup-shaped body 102 fitted inside cavity 96 with its own concavity facing boiler 6, and comprising an externally threaded lateral wall 103 engaging the internal thread of cavity 96, and a bottom wall 104 having a number of through holes 105. Hydraulic cylinder 99 also comprises a piston 106 mounted to slide inside cup-shaped body 102 and having a rod 107 sliding in fluidtight manner inside liner 97. Piston 106 is defined by two plates 108, 109 defining in between a chamber 110; plate 108 is integral with rod 107; and plate 109 is fitted, on the side facing bottom wall 104, with needles 111, each of which is hollow, is coaxial with a respective hole 105, and communicates with chamber 110 via a respective hole 112 formed through plate 109.

Chamber 110 communicates with hole 101 via an axial hole 113 formed along rod 107 and closed, not in fluidtight manner and on the side facing chamber 110, by a threaded cap 114, in which is formed, on the side facing plate 109, a seat for supporting a spring 115, which frictionally engages a through hole in plate 109 and is compressed between cap 114 and bottom wall 104. Hole 113 houses valve 18, the shutter 35 of which is mounted to slide along hole 113 in opposition to relative spring 36 compressed between cap 114 and shutter 35 to keep shutter 35, at rest, contacting a seat formed at the end of hole 113 facing boiler 6.

Cup-shaped body 102, piston 106 and needles 111 are so sized that, when rod 107, at rest, is maintained contacting plate 100 by spring 115, piercing device 98 is set to a withdrawn position in which the free end of each needle 111 engages respective hole 105 but does not project from plate 109. Conversely, when piston 106 is moved, in opposition to spring 115, into contact with bottom wall 104, piercing device 98 is set to an extracted position in which part of the length of each needle 111 projects outwards of cup-shaped body 102 through respective hole 105.

When pressurized hot water is fed, in use, along conduit 11 to both conduits 17 and 19, it is prevented temporarily by valve 18 from issuing from sprinkler 16, while the pressurized hot water fed to hydraulic cylinder 13 moves dispenser cup 15 into contact with sprinkler 16, and the sealing film 86 of sealed capsule 81 cooperates in fluidtight manner with the outer surface of bottom wall 104 of hydraulic cylinder 99.

Fluidtight contact of sealed capsule 81 and sprinkler 16 arrests piston 14 and simultaneously increases the pressure in conduits 17 and 19. As opposed to opening valve 18, however, the increase in pressure moves piston 106 towards bottom wall 104, in opposition to spring 115, so as to extract needles 111 from respective holes 105 and pierce sealing film 86 of sealed capsule 81.

When piston 106 is arrested against bottom wall 104, the pressure inside conduits 17 and 19 increases further and finally opens valve 18, so that hot water is fed into sealed capsule 81 through valve 18, cap 114, chamber 110, holes 112 and needles 111. The pressurized hot water fed into sealed capsule 81—which, as stated, is made of thermoplastic material—deforms bottom wall 83, which curves outwards into chamber 91 and into contact with the tips of needles 93, which pierce it to connect the inside of sealed capsule 81 to spout 56 and so allow the liquid coffee to flow through the lateral grooves 94 in needles 93 into spout 56.

Figure 10:
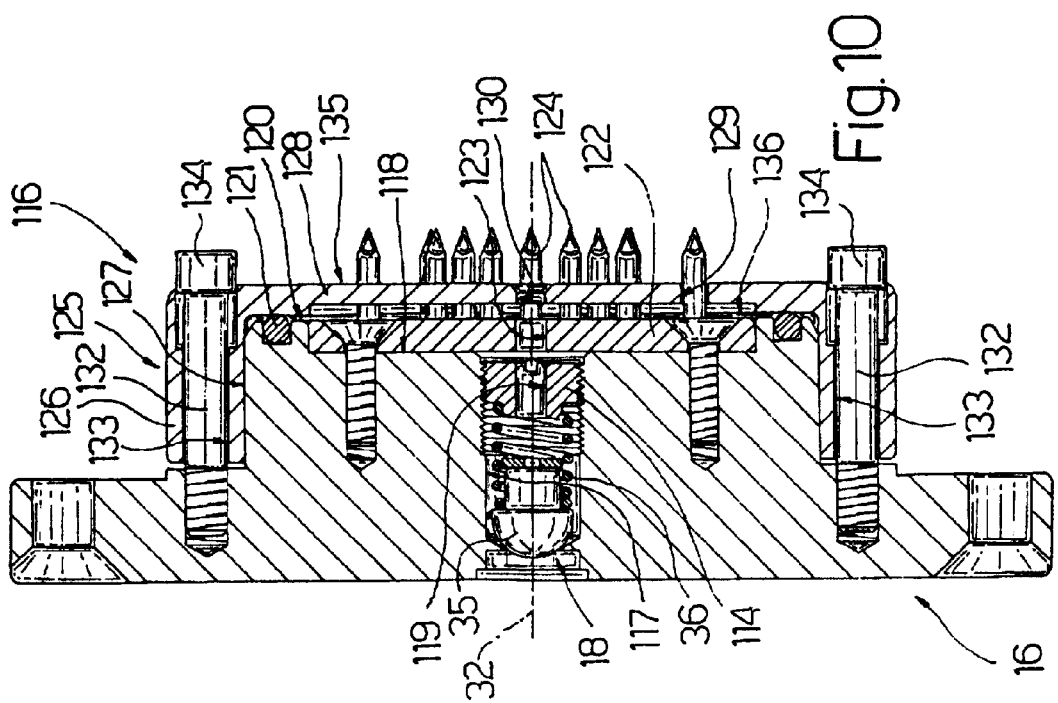
FIG. 10 shows a section along line X—X in FIG. 9 of a detail in FIG. 9 in a different operating position.
Figure 9:
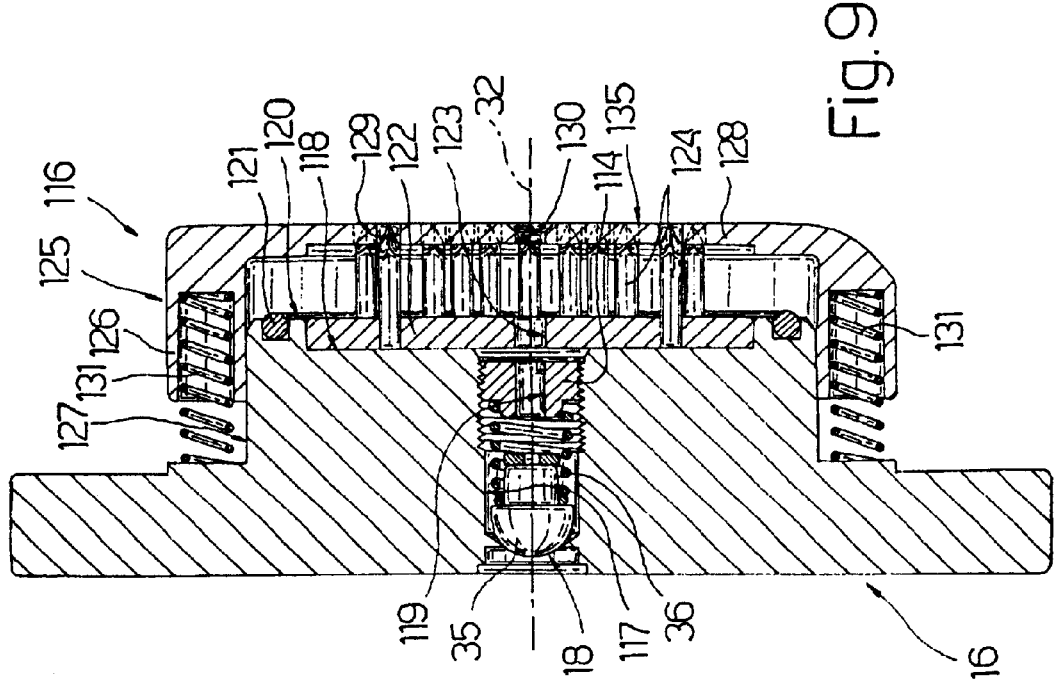
FIG. 9 shows an axial section of a variation of a detail in FIG. 8 in a distinct operating position.

The FIGS. 9 and 10 variation relates to a further piercing device 116 for piercing sealed capsules 81 and fitted to sprinkler 16 in place of piercing device 98.

When piecing device 116 is used, sprinkler 16 simply has an axial through hole 117, which, like hole 113 in FIG. 8, communicates on one side with hole 33 (not shown in FIGS. 9 and 10), and comes out on the other side inside a cylindrical axial cavity 118 coaxial with axis 32 and facing dispenser cup 15. Hole 117 is controlled by valve 18, which, as in piercing device 98, comprises shutter 35 and spring 36 compressed between shutter 35 and cap 114 closing hole 117. An axial hole 119 is formed through cap 114 to connect cavity 118 to hole 117 downstream from shutter 35.

Cavity 118 is surrounded by an annular groove formed in a flat annular end surface 120 of sprinkler 16 and housing an annular sealing member 121, which projects frontwards of annular surface 120 and surrounds a plate 122 fixed inside cavity 118 and having a central through hole 123 communicating with hole 119 and coaxial with axis 32.

Plate 122 forms part of piercing device 116 and comprises, on the side facing dispenser cup 15, a number of needles 124 integral with plate 122 and extending from plate 122 towards dispenser cup 15 in a direction parallel to axis 32. In addition to plate 122 and needles 124, piercing device 116 also comprises a cup-shaped body 125 coaxial with axis 32, positioned with its concavity facing cavity 118, and connected in axially-sliding manner to sprinkler 16. Cup-shaped body 125 comprises a cylindrical lateral wall 126, an inner surface of which mates in sliding manner with a cylindrical outer surface 127 of sprinkler 16; and a bottom wall 128 facing and parallel to annular surface 120 and having a number of holes 129 coaxial with respective needles 124, and a central hole 130 coaxial with axis 32.

Cup-shaped body 125 is movable axially—in opposition to a number of axial springs 131 compressed between sprinkler 16 and lateral wall 126, and along a number of pins 132 projecting axially from sprinkler 16 and engaged in sliding manner through respective axial holes 133 formed in the thickness of lateral wall 126—between a rest position (FIG. 9) defined by stop members defined by respective heads 134 of pins 132, and in which needles 124 are housed entirely inside cup-shaped body 125, and a work position (FIG. 10) in which bottom wall 128 contacts sealing member 121, and needles 124 project beyond an outer surface 135 of bottom wall 128 through respective holes 129.

In actual use, when the thrust imparted by piston 14 to dispenser cup 15 brings sealing film 86 to rest in fluidtight manner on outer surface 135 of bottom wall 128 of cup-shaped body 125, sealed capsule 81 slides cup-shaped body 125 axially on sprinkler 16 in opposition to springs 131, which compress to allow needles 124 to project beyond bottom wall 128 to pierce sealing film 86.

When the bottom wall 128 contacts sealing member 121 (FIG. 10) and is arrested in the withdrawn position, the pressure upstream from valve 18 increases to open valve 18, so that pressurized hot water flows through holes 119 and 123 into a chamber 136 defined (FIG. 10) by cup-shaped body 125 in the withdrawn position and by plate 122. From chamber 136, the pressurized hot water flows into sealed capsule 81 through central hole 130 and the holes (not shown) pierced in sealing film 86 by needles 124.

What is claimed is:

1. A coffee machine comprising:
    a horizontal dispenser assembly, in turn comprising a boiler with a pressurized-hot-water sprinkler;
    a dispenser cup for housing at least part of a ground-coffee container, the dispenser cup being positioned facing said sprinkler;
    a hydraulic thrust cylinder aligned with the boiler along a horizontal first axis and located on the opposite side of said dispenser cup to the boiler, the hydraulic cylinder comprising a piston for moving the dispenser cup to and from an infusion position in which the dispenser cup is connected to said sprinkler;
    a vertical loading conduit for loading a said container between said sprinkler and said dispenser cup;
    said dispenser cup is supported by said piston to oscillate, with respect to the piston and about a second axis crosswise to said first axis, between a load setting in which the dispenser cup faces at least partly upwards and towards said loading conduit, and an unload setting in which the dispenser cup is oriented at least partly downwards, and via an infusion setting assumed by the dispenser cup in said infusion position, and in which the dispenser cup is coaxial with said first axis.

2. A machine as claimed in claim 1, wherein said second axis is a horizontal axis perpendicular to said first axis.

3. A machine as claimed in claim 1, wherein:
    said piston is movable along said first axis to move said dispenser cup along said first axis to and from said infusion position;
    said dispenser cup being oscillated about said second axis by a thrust imparted to the dispenser cup by said piston in a direction parallel to said first axis.

4. A machine as claimed in claim 1, wherein first elastic means are interposed between said dispenser cup and said piston to push the dispenser cup into said load setting.

5. A machine as claimed in claim 4, wherein supporting means are interposed between said dispenser cup and said piston to arrest the dispenser cup in said load setting in opposition to said first elastic means.

6. A machine as claimed in claim 5, wherein said supporting means are elastic supporting means.

7. A machine as claimed in claim 1, and comprising first contrasting means located along a path of said dispenser cup into said infusion position, and cooperating with a portion of the dispenser cup located below said second axis, so as to generate a moment by which to rotate the dispenser cup from said load setting to said infusion setting.

8. A machine as claimed in claim 7, wherein said first contrasting means are carried by said sprinkler.

9. A machine as claimed in claim 1, and comprising second contrasting means located along a path of said dispenser cup into said infusion position, and cooperating with a portion of the dispenser cup located over said second axis, so as to generate a moment by which to rotate the dispenser cup from said infusion setting to said unload setting.

10. A machine as claimed in claim 9, wherein said second contrasting means comprise a retaining device in turn comprising a pin carried by said dispenser cup over said second axis; and a rod having a first end hinged to said sprinkler over said second axis so as to rotate upwards about a third axis parallel to said second axis and in opposition to second elastic means, and a second end facing said hydraulic cylinder and shaped in the form of a hook having a concave surface facing downwards and engaged by said pin.

11. A machine as claimed in claim 10, wherein said sprinkler and said dispenser cup comprise a first and, respectively, second contact surface parallel to each other and substantially contacting each other when the dispenser cup is in said infusion position; said rod being of such a length that the distance between said hook and said first contact surface is greater than the distance between said pin and said second contact surface, and is less than the distance between said pin and said first contact surface when the dispenser cup is in the load setting.

12. A machine as claimed in claim 1, wherein:
said container is a wafer; said loading conduit being shaped to feed said wafer to said dispenser cup; and
the dispenser cup having a first cavity facing said sprinkler and for housing at least part of said wafer.

13. A machine as claimed in claim 12, wherein said sprinkler comprises a second cavity facing said first cavity and for housing part of said wafer.

14. A machine as claimed in claim 13, wherein first and second elastic extracting means are located inside said first and second cavity respectively, to facilitate unloading of said wafer.

15. A machine as claimed in claim 1, wherein:
said container is a rigid capsule;
said loading conduit being shaped to feed said rigid capsule to said dispenser cup; and
the dispenser cup having a cavity facing said sprinkler and for housing at least part of said rigid capsule.

16. A machine as claimed in claim 15, wherein:
said rigid capsule is a sealed capsule comprising a cup-shaped body housing a measure of ground coffee and closed by a sealing film facing the sprinkler in use;
said sprinkler comprising a piercing device for piercing said sealing film when said dispenser cup is in said infusion position.

17. A machine as claimed in claim 16, wherein said piercing device comprises a number of needles.

18. A machine as claimed in claim 17, wherein said needles are movable towards said dispenser cup from a withdrawn rest position to an extracted piercing position.

19. A machine as claimed in claim 17, wherein said needles are movable towards said dispenser cup from a withdrawn rest position to an extracted piercing position by the thrust exerted by pressurized hot water from said boiler.

20. A machine as claimed in claim 17, wherein said needles are hollow needles communicating with a supply conduit for supplying pressurized hot water to said sprinkler.

21. A machine as claimed in claim 20, wherein a valve is located between said hollow needles and said supply conduit to only allow said pressurized hot water to reach said hollow needles when the pressure of the hot water reaches a given value.

22. A machine as claimed in claim 18, and comprising:
a hydraulic cylinder communicating on one side with a supply conduit for supplying hot water to said sprinkler, and closed on the other side by a perforated wall facing said dispenser cup and positioned, in use and when the dispenser cup is in said infusion position, contacting the sealing film of a said sealed capsule housed inside the dispenser cup;
said hydraulic cylinder comprising a piston supporting said needles and movable to and from said perforated wall to move the needles, through said perforated wall, between a withdrawn rest position and an extracted piercing position piercing said sealed film.

23. A machine as claimed in claim 20, wherein said piston comprises an inner chamber communicating on one side with said hollow needles and on the other side with said supply conduit via a hole housing said valve.

24. A machine as claimed in claim 17, wherein said needles extend from said sprinkler to said dispenser cup and are fixed with respect to the sprinkler.

25. A machine as claimed in claim 24, wherein said piercing device comprises a cup-shaped body having a perforated bottom wall for the passage of said needles, and fitted in sliding manner to said sprinkler to move, in opposition to elastic means, between a normal rest position in which said needles are housed inside said cup-shaped body, and a work position in which said needles extend outwards of said cup-shaped body through respective holes in said perforated bottom wall.

* * * * *

UNITED STATES PATENT AND TRADEMARK OFFICE
CERTIFICATE OF CORRECTION

PATENT NO. : 6,584,888 B2
DATED : July 1, 2003
INVENTOR(S) : Virginio Cortese

It is certified that error appears in the above-identified patent and that said Letters Patent is hereby corrected as shown below:

<u>Title page,</u>
Item [30], Foreign Application Priority Data, replace "T020A1226" with -- T02000A001226 --; and replace "T021A0115" with -- T02001A000115 --.

Signed and Sealed this

Eleventh Day of November, 2003

JAMES E. ROGAN
*Director of the United States Patent and Trademark Office*